United States Patent [19]

Conway

[11] 4,227,839

[45] Oct. 14, 1980

[54] ANGLE INDICATING ATTACHMENT FOR DRILLS

[76] Inventor: Ceil L. Conway, 2003 N. Brentwood, Essexville, Mich. 48732

[21] Appl. No.: 964,786

[22] Filed: Nov. 29, 1978

[51] Int. Cl.[3] .......................... B23B 49/00; B23B 39/00

[52] U.S. Cl. .......................................... 408/16; 408/112; 408/241 R

[58] Field of Search .................... 408/16, 89, 116, 112, 408/113, 114, 115, 110, 241

[56] References Cited

U.S. PATENT DOCUMENTS

| | | | |
|---|---|---|---|
| 889,273 | 6/1908 | Thomas | 408/16 |
| 2,454,372 | 11/1948 | Billeter | 408/241 |
| 2,670,638 | 3/1954 | Roy, Sr. | 408/112 |
| 2,802,380 | 8/1957 | Fossheim | 408/16 |
| 3,242,773 | 3/1966 | Van Praag | 408/16 |
| 3,664,754 | 5/1972 | Kelbel | 408/241 |
| 3,890,058 | 6/1975 | Self et al. | 408/112 |

*Primary Examiner*—Harrison L. Hinson

*Attorney, Agent, or Firm*—Clarence A. O'Brien; Harvey B. Jacobson

[57] ABSTRACT

A device to be attached to drills, particularly power drills, for indicating the angular relation of the rotational axis of the drill to a surface being drilled and permitting the drill operator to guide the drill in accurately pointing the axis of the drill bit at any angle up to about 45° out of square, or plumb to about 45° out of plumb, or any combination thereof. Furthermore, the device can be utilized as an angle drilling gauge independently of its attachment to a drill in order to determine the angle between two planar surfaces joined at an angle from square to about 45° right or 45° left out of square.

10 Claims, 7 Drawing Figures

ANGLE INDICATING ATTACHMENT FOR DRILLS

BACKGROUND OF THE INVENTION

1. Field of the Invention

The invention relates to a device for indicating angular orientation with respect to a plane surface. More particularly, the invention comprises an attachment for a drill, specifically a power drill, for indicating the angular position of the drill bit in two dimensions with respect to a surface being drilled. Moreover, the device is usable by itself to indicate the angular relationship of planar surfaces, such as boards, which are square or up to about 45° out of square.

2. Description of the Prior Art

Prior patents disclose the basic concept of providing a guide or indicator for a drill, such as U.S. Pat. No. 3,242,773, issued Mar. 29, 1966, to Van Pragg, which discloses a hand electric drill attachment for use in drilling a hole at any angle in a horizontal plane and also discloses an angle selector for pivoting the drill in the vertical plane. This device, however, is characterized by difficulty in maintaining a tightened position, since the angle indicating device is subject to vibration of the workpiece as drilling proceeds, and vibration is transmitted from the angle indicating device backwardly to the hand of the operator. Moreover, it is necessary for the operator to focus his attention upon the rapidly vibrating flange of the angle selector in the horizontal plane, thereby diverting his attention from the angle selector in the vertical plane. The present invention overcomes these difficulties by providing indicating devices in close proximity, neither of which is subjected to direct vibration from the workpiece. U.S. Pat. Nos. 2,525,387, issued Oct. 10, 1950, to Volk, and 3,807,051, issued Apr. 30, 1974, to Funakubo, show indicating devices in combination with drilling tools whereby the tooling angle can be determined for a variety of drilling angles. U.S. Pat. Nos. 3,864,053, issued Feb. 4, 1975, to Harwood, and 3,809,489, issued May 7, 1974, to Harwood, disclose jigs which are used to support a drill in a particular angular relationship with respect to a surface being drilled. Other patents of interest for showing drilling tool accessories include the following: U.S. Pat. Nos. 2,635,348—Apr. 21, 1953—Jones, 3,052,036—Sep. 4, 1962—Oliver, 3,707,043—Dec. 26, 1972—Jones.

SUMMARY OF THE INVENTION

The invention overcomes drawbacks from prior art devices by providing means for accurately displaying a desired angle of drilling in both the horizontal and vertical planes, while doing so without transmitting an excessive degree of vibration to the hand of the operator.

Accordingly, it is an object of the present invention to provide such a guiding and indicating device for use with conventional power or hand drilling tools.

Another object of the invention is to provide an angle indicating drill attachment which is readily attachable and detachable from drills of conventional construction.

Still another object of the invention is to provide an angle indicating attachment for drills which is detachable for use independently to determine the angle between parallel surfaces, such as boards which are square or out of square by up to about 45°.

Yet another object of the invention is to provide a horizontal angle indicator attachment for drills where parallel angle gauge pivot rods project forwardly in the direction of drilling to measure the inclination of the longitudinal axis of the drill bit in a horizontal plane, and by suitable mechanical linkage to display this angle for indicating and for guiding purposes.

Yet another further object of the invention is to provide spring bias means for the angle gauge pivot rods to permit their backward retraction as drilling proceeds, while accurate angle measurement in the horizontal plane continues to be displayed.

Still another further object of the invention is to substantially avoid inaccuracy of readings resulting from indicators wherein a parallax problem causes the reading observed to depend upon the position from which the indicator is viewed.

Another further object of the invention is to provide an angle indicating device adaptable for guiding almost any make and size of portable drill, and to be simple and relatively inexpensive in its construction, maintenance and operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
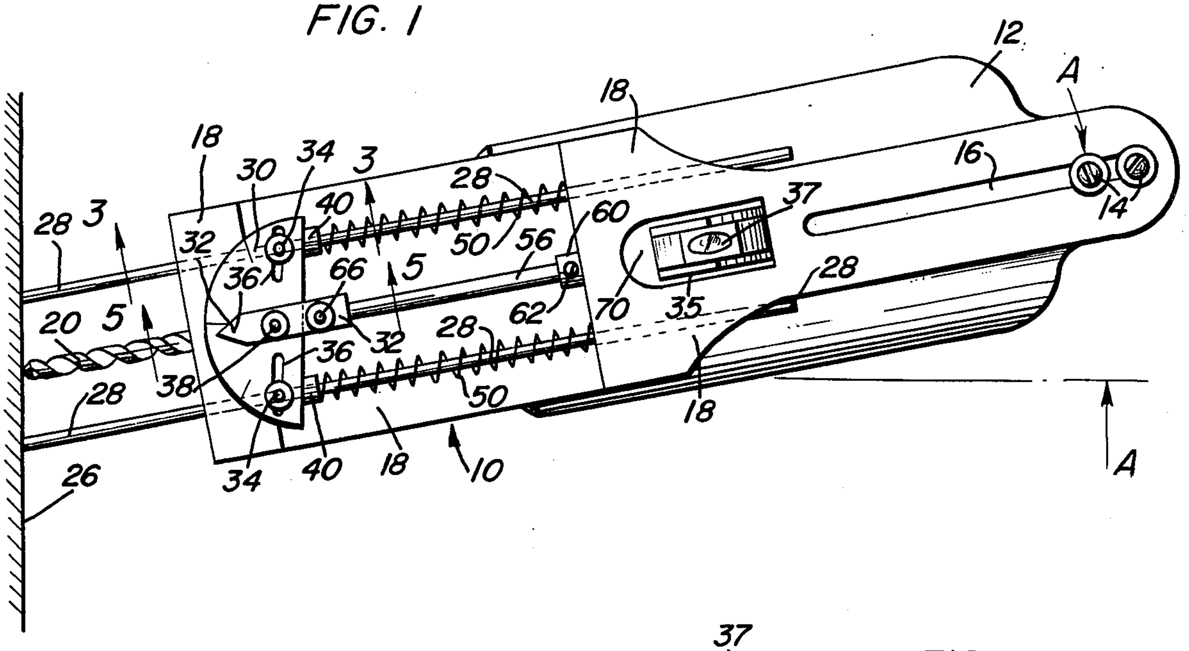
FIG. 1 is a top plan view of the present invention installed on a portable conventional power drill.
Figure 2:
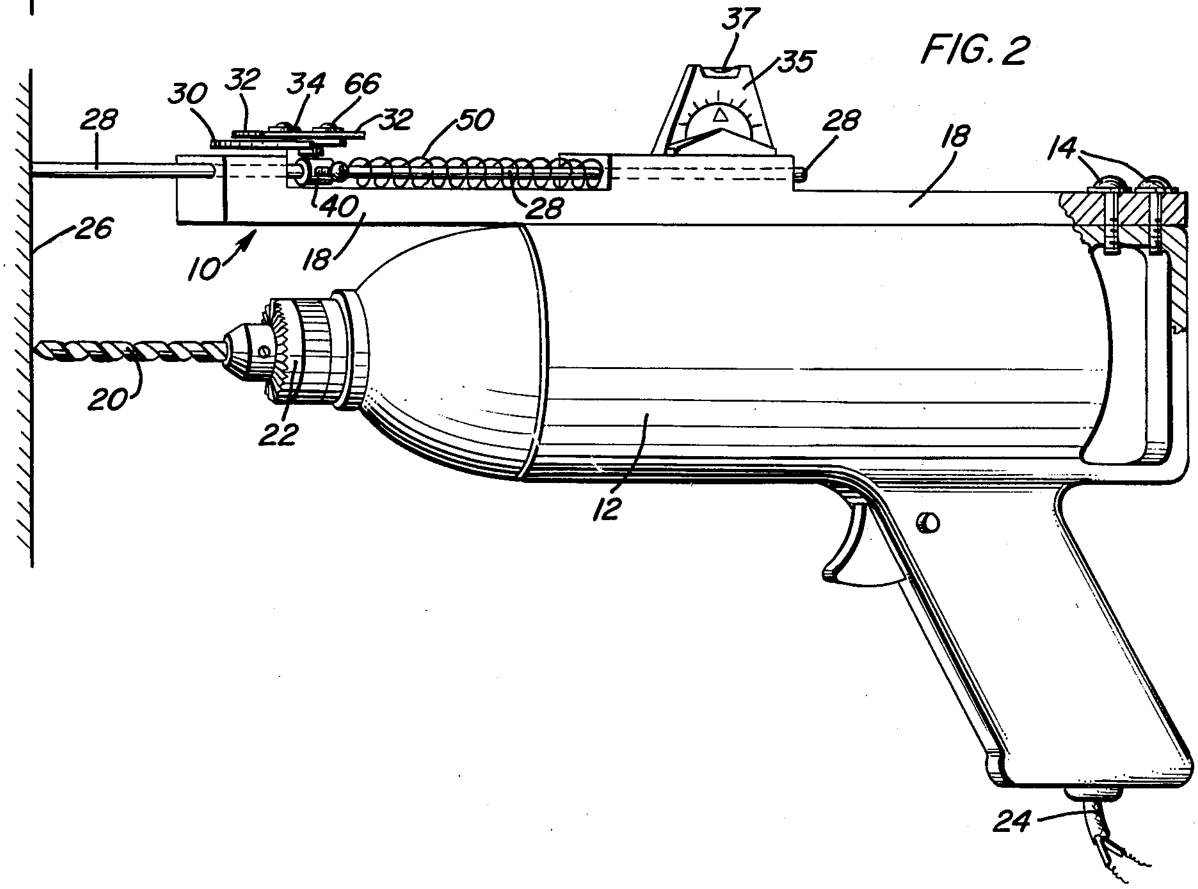
FIG. 2 is a side elevational view of the device illustrated in FIG. 1, directed at a slight angle to the drilling surface.
Figure 3:
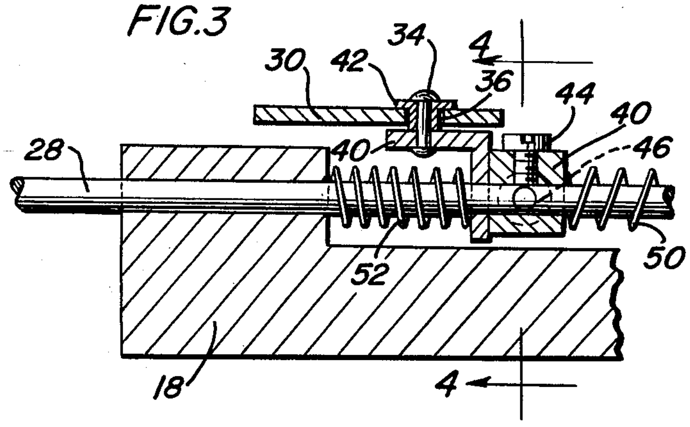
FIG. 3 is a longitudinal enlarged sectional view of the forward portion of the right guide assembly, taken substantially upon a plane passing along section line 3—3 on FIG. 1, and showing details of the mounting means for the angle indicator.
Figure 4:
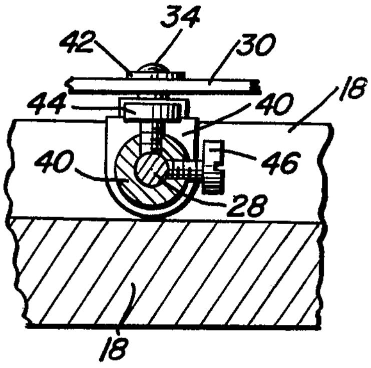
FIG. 4 is a transverse sectional view of the right guiding assembly of FIG. 3, taken substantially upon a plane passing along section line 4—4 on FIG. 3.
Figure 5:
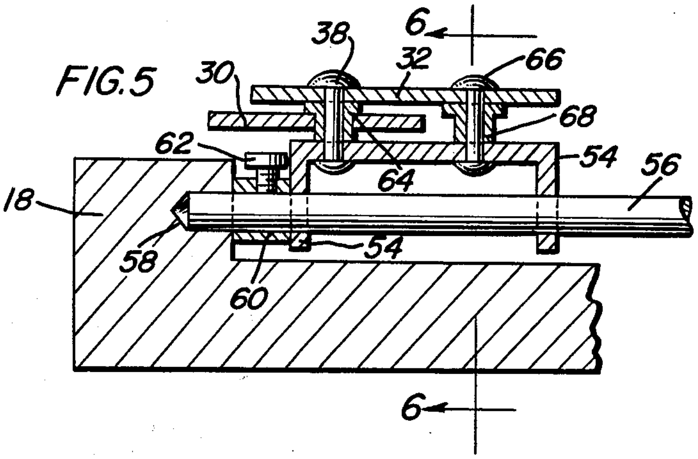
FIG. 5 is an enlarged longitudinal sectional view of the carriage shaft assembly, taken substantially upon a plane passing along section line 5—5 on FIG. 1.
Figure 6:
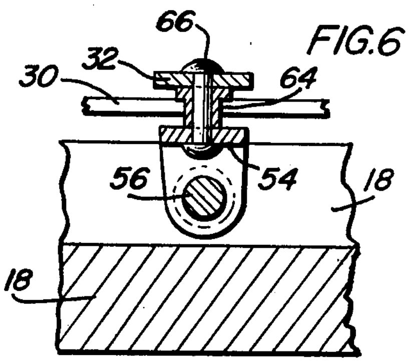
FIG. 6 is a transverse sectional view of the carriage assembly, taken substantially upon a plane passing along section line 6—6 on FIG. 5.

FIG. 1 shows the device of the present invention, designated generally by the numeral 10, as attached to a conventional power drill 12 at the rear thereof by adjusting bolts 14, which permit device 10 to slide longitudinally on drill 12 as adjusting bolts 14 slide through mounting slot 16 in body 18 of device 10. As illustrated in FIG. 2, power drill 12 is made up of drill bit 20, attached through chuck 22 to the remaining structure of power drill 12 for controllably imparting rotary motion to bit 20. Electrical power for operating drill 12 is furnished through power cord 24.

In FIG. 1, device 10 is shown in a position forming an angle A between the longitudinal axis of drill bit 20 and drilling surface 26. Angle gauge pivot rods 28 contact surface 26 and cause angle gauge 30 to rotate with respect to the longitudinal direction of drill bit 20 through angle A. Angle indicator 32, which maintains its longitudinal alignment, permits reading of angle A on angle gauge 30. Through visual observation of angle gauge 30, angle A can be maintained as drill 12 is operated and drill bit 20 is driven leftwardly into surface 26. Simultaneously, the vertical dip or angle which the longitudinal axis forms with plumb is observable on protractor 35, including monovial level indicator 37. Both angle indicator 32 and level indicator 37 are conveniently observable during drilling operations, and consequently, the angular relationship of the drill hole in surface 26 is accurately determinable in both the horizontal dimension and the vertical dimension.

Referring now to FIGS. 3 to 6, as well as FIGS. 1 and 2, the horizontal angle indicating component of device 10, besides angle gauge 30 and angle indicator 32, is seen to comprise angle indicator rivets 34 and bushings 42, which go through and slide within angle indicator slots 36 in angle gauge 30 on top of clamps 40 to cause angle gauge 30 to pivot about pivot rivet 38. Pivoting of angle gauge 30 occurs in response to longitudinal displacement of angle gauge pivot rod clamps 40. Rivets 34 go through bushings 42, through angle gauge pivot rod clamps 40, being riveted by standard techniques. Angle gauge pivot rod clamps 40 are held to angle gauge pivot rods 28 by top clamp screws 44 and side clamp screws 46, and clamps 40 are biased by return springs 50 to exert a constant outward force on surface 26 as drilling proceeds. Gauge spring 52 protects and cushions the horizontal angle indicating assembly from contact with body 18 when the assembly returns to its original forward position after rearward displacement by angle gauge pivot rods 28.

Angle gauge 30 and angle indicator 32 are both supported upon carriage 54, which rides upon carriage shaft 56. Carriage shaft 56 guides carriage 54 along its longitudinal extent as angle gauge 30 is moved longitudinally in response to longitudinal displacement of angle gauge pivot rods 28. Carriage shaft 56 is secured in recesses 58 in body 18 with the aid of carriage shaft clamps 60, which are held on carriage shaft 56 by shaft clamp screws 62. Accordingly, clamps 60 define the limits of travel of carriage 54. These limits can be adjusted and extended somewhat by adjustment of the position of device 10 upon power drill 12, through the aforementioned adjustment of adjusting bolts 14 in mounting slot 16. Returning to FIGS. 5 and 6, pivot rivet 38 is mounted in carriage 54 through bushing 64, which goes through gauge 30, allowing gauge 30 to pivot freely, and angle indicator 32 is further secured to carriage 54 by rivets 66 through bushing 68. Bushings 64 and 68 support and are the foundation for angle indicator 32, with bushings 64 and 68 being located on top of carriage 54. Bushings 64 and 68 act as spacers to hold indicator 32 in a stationary position by tension of rivets 38 and 66, which pass through bushings 64 and 68 respectively. Indicator 32 must be stationary in order to point to markings inscribed on angle gauge 30 to thereby indicate the angle to be drilled. It should be noted that angle gauge 30 is free to pivot about pivot rivet 38, while angle indicator 32 is fixedly attached in the longitudinal direction without freedom to pivot in any direction. Accordingly, gate indicator 32 travels as a unit with angle gauge 30 in response to longitudinal displacement of angle gauge 30, pivot rivet 38 and carriage 54.

Referring back to FIG. 1, mounting plate 70 is countersunk into body 18 and attached thereto by suitable means, such as screws, a secure adhesive, such as an epoxy or other glue, or other means, and is preferably constructed of a magnetic material to provide the foundation for protractor 35, which preferably has a magnetized base for mounting thereon. Other removable mounting means, however, for protractor 35 can alternatively be used. Protractor 35 is chosen from many conventional devices which rely upon the force of gravity, such as a floating pointer mechanism, to indicate and disply the vertical direction. Graduations on protractor 35 permit visual observation of any desired angle in which device 10 is held in the vertical plane during drilling or otherwise. In addition, monovial level indicator 37 can be used when it is desired in a drilling operation to maintain drill bit 20 in a horizontal plane. In another arrangement of protractor 35, the monovial level can be rotated through a desired angle of drilling and set to that angle. Observation of the level indicator 37 then permits the chosen angle to be maintained during drilling, thereby obviating the necessity for continual observation of a graduated protractor scale. Levels and protractors of the type described are conventional and well-known in the art, the present invention relating only to the combination of such a device with the horizontal angle indicating assembly described herein.

Figure 7:
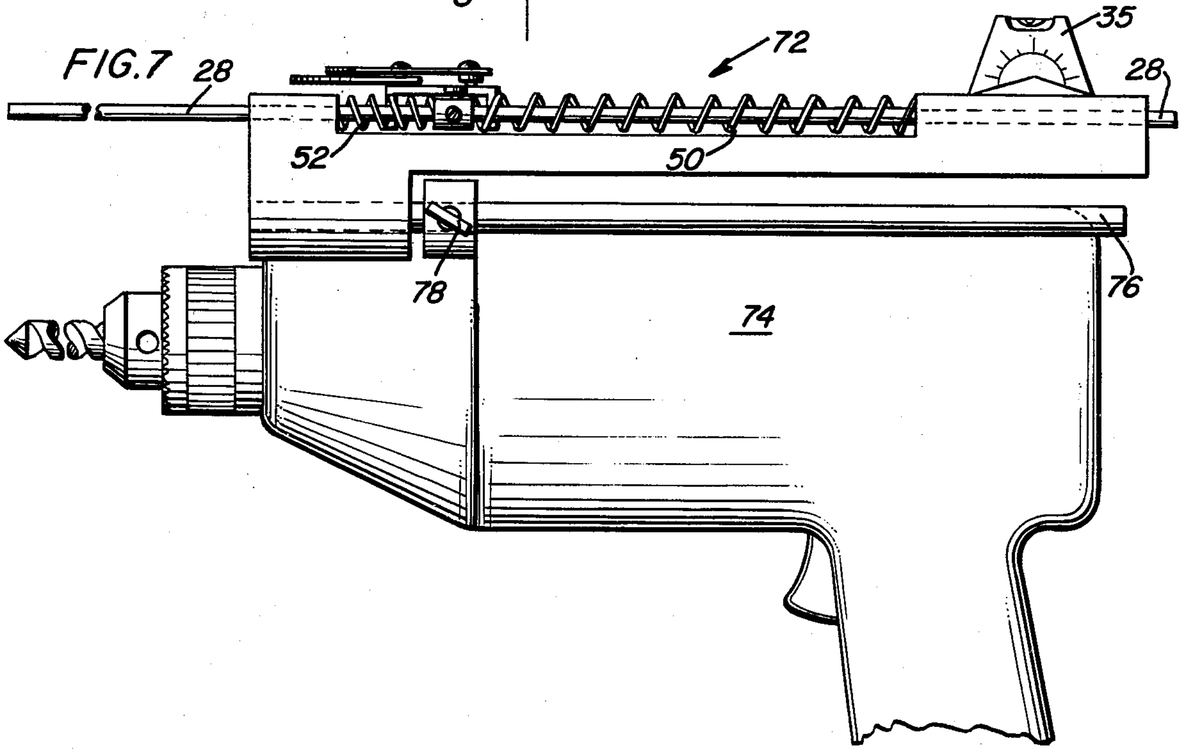
FIG. 7 is a side elevational view of the device mounted upon a conventional power drill of somewhat different construction having a conventional depth gauge, wherey a rod is attached in place thereof.

FIG. 7 illustrates a second embodiment 72 of the invention, differing from device 10 only in the structure of the mounting means on power drill 74, which is an example of a hammer drill normally equipped with a depth gauge, which is removed and rod 76 substituted in place thereof for attaching device 10 by adjustment of thumb screw 78, the embodiment 72 of the present invention on rod 76.

In operation, the present invention can be used to drill into a wall or object which is plumb, or into a floor or object which is level. Alternatively, an object which is neither plumb nor level can be drilled at a desired angle, either by first measuring the angular orientation of the object and thereby determining the angle to be drilled, or by other means for selecting the angular orientation to be used.

In order to drill into a wall or object which is plumb, a true hole is easily drilled by holding angle gauge pivot rods 28 to surface 26 so that angle gauge 30 is centered on 0 degrees and protractor 35 reads at 0 degrees. A hole drilled in such a manner is level and true. However, if the drill hole is desired at a different angle from 0 degrees to 45° in a horizontal plane, rods 28 are held to surface 26 and drill 12 is moved in a manner so that angle gauge 30 reads the desired angle, while protractor 35 is kept at 0 degrees. If a hole is desired which is square but out of level, rods 28 are held to surface 26 with angle gauge 30 reading at 0 degrees and protractor 35 is set to the desired angle. Drill 12 is raised or lowered until level indicator 37 shows the proper angle. It is possible to drill a hole with any desired angle right or left while level, or any degree out of level while square to the object. Furthermore, any combination of either right or left from square and out of level up or down can be selected. However, as a practical matter, it is best to limit the maximum inclination of drill bit 20 from the perpendicular to surface 26 to about 45°.

In order to drill into a floor or object which is level, the drill is held with rods 28 in contact with the floor so that angle gauge 30 reads 0 degrees and protractor 35 reads 90°. The result of such drilling is a hole which is both square and plumb. To drill a hole at any angle from 0 degrees to 45° out of square, the drill is held so that angle gauge 30 reads the desired angle left or right on gauge 30, while protractor 35 is maintained at 90°. This will give a hole at the desired angle but still plumb. To drill a hole positioned square but out of plumb, rods 28 are held with angle gauge 30 at 0 degrees, and protractor 35 is set to any desired setting from 90° to 45°. Again, the hole can be drilled square to the floor or object, and at any desired angle from plumb to 45° out of plumb. By using a combination of angle gauge and protractor settings, level holes can be drilled in a level floor or object at any angle left or right to 45° from square, or square holes can be drilled from plumb to 45° out of plumb, or any combination of either can be effected.

If the surface to be drilled is out of level, protractor 35 can be removed from its flat magnetic mounting plate 70 and placed upon the surface to determine the degree which the surface is out of level. When it is known, for example, that the surface is 15° out of level, the protractor level can then be replaced on flat plate 70 and set at 15° out of plumb. By drilling at such a setting, a true hole can then be drilled.

Device 10 can conveniently be used independently of drill 12 as an angle measuring device. For example, to determine the angle at which two boards are joined together, device 10 after removal from drill 12 by disconnection of bolts 14 is placed along its side on the side of one board and permitted to slide toward the other board until rods 28 strike the second board. Direct reading of angle gauge 30 gives the angle which the boards are out of square, or a reading of 0 degrees indicates that the boards are square.

Rods 28 can be provided with an end cover made from rubber or plastic (not shown) in prevent rods 28 from scratching surface 26, a particularly important consideration when object 26 is to be used as furniture, panelling, or the like. Moreover, additional bracing (not shown) can be used to secure body 18 to drill 12, such bracing being conventional in construction and selectable, for example, from tightenable bands secured to body 18 for tightening of body 18 on drill 12, additional screws for fastening to drill 12 near the forward extent of its housing, fasteners of known and conventional construction for fastening, clamping, snap fitting, or otherwise removably securing body 18 to drill 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device having angle indicating means for removable attachment to a hand held drilling tool comprising, in combination, an elongated, symmetric body being rigidly and removably held above said drilling tool along its longitudinal extent by attaching means, visual vertical angle indicating means and visual horizontal angle indicating means, said horizontal indicating means including a pair of parallel forwardly extending angle gauge pivot rods held by said body in spaced relationship for contacting a surface for drilling by said drilling tool, said rods being adapted to move freely in the longitudinal direction and to orient indicating means attached to said body for indicating the horizontal angular relation of said drilling tool to said surface, said indicating means comprises an angle gauge pivotable, in response to relative moving displacement of said rods, about a pivot axis longitudinally slidable in the plane of symmetry of said body, said indicating means further including an angle indicator fixed in angular position with respect to the longitudinal extent of said body for visual observation of the angle of pivoting of said angle gauge about said pivot axis wherein said horizontal and vertical angle indicating means permit continued visual observation during use of said drilling tool in drilling into a flat surface.

2. The device of claim 1 wherein a pivot pin is centered on said pivot axis and is attached to carrying means freely slidable on a carriage shaft, said pivot pin securing said angle indicator to said carrying means, and said angle indicator being further secured to said carrying means by an indicator rivet.

3. The device of claim 2 wherein each of said angle gauge pivot rods is connected by a link means to said angle gauge, each of said link means being biased by elastic compression means acting longitudinally along said rod between said link means and said body, the link means being attached to the angle gauge at points equally spaced from the plane of symmetry of said body.

4. The device of claim 3 wherein said link means comprises a pair of angle gauge pivot rod clamps respectively attached to said angle gauge pivot rods, a pair of pivot rod rivets slidably passing respectively through a pair of slots in said angle gauge and respectively passing through a pair of bushings attached to said angle gauge pivot rod clamps for rotation within said bushings and for effecting pivotal motion of said angle gauge in response to relative sliding motion of said angle gauge pivot rods, said elastic compression means comprising a pair of return springs respectively surrounding said angle gauge pivot rods between said respective clamps and said body.

5. The device of claim 4 wherein said body includes a longitudinal mounting slot and said attachment means includes at least one threaded adjusting bolt for passing through said mounting slot to attach said body to a compatibly threaded recess in said drilling tool, and said vertical angle indicating means includes a protractor and monovial level indicator held by magnetic mounting means to a magnetic mounting plate countersunk into said body and secured thereto.

6. A measuring device for determining the angle between two planar surfaces comprising an elongated body, a pair of parallel angle gauge pivot rods in parallel spaced relationship passing slidably through said body, an angle gauge pivotably mounted on carrying means slidable longitudinally along said body, and link means for pivoting said angle gauge in response to relative linear displacement of said angle gauge pivot rods.

7. The device of claim 6 wherein said carrying means comprises a carriage slidably mounted on a carriage shaft, said angle gauge is a semicircular rigid planar disk having radial slots diametrically opposed from said pivot axis and passing over said angle gauge pivot rods, each of said pivot rods having a clamp rigidly attached thereto, said clamp having rotatably fitting therein a rivet extending through said slot for moving said angle gauge in response to linear extension of said pivot rod and thereby measuring the angular orientation of one of said planar surfaces in fixed relationship to said body with respect to the other of said planar surfaces in contact with said pivot rods.

8. A method of using the device of claim 7 comprising fixing the orientation of said body with respect to the first of said planar surfaces, sliding said body in the direction of said second planar surface, extending said pivot rods rearwardly by contact of said rods with said second planar surface, and observing the degree of rotation of said angle gauge in response to said rearward extension of the pivot rods.

9. A device having angle indicating means for removable attachment to a hand held drilling tool comprising, in combination, visual vertical angle indicating means and visual horizontal angle indicating means, said horizontal indicating means including a pair of parallel forwardly extending angle gauge pivot rods held in spaced relationship for contacting a surface for drilling by said drilling tool, said rods being adapted to move freely along the longitudinal extent of said drilling tool and to orient indicating means for indicating the horizontal angular relation of said drilling tool to said surface, said indicating means comprising an angle gauge pivotable, in response to relative linear displacement of said rods, said rods being pivotably connected with said indicating means wherein said horizontal and vertical angle indicating means permit continued visual observation during use of said drilling tool in drilling into a surface.

10. The device of claim 9 wherein said vertical angle indicating means includes a protractor and monovial level indicator held by magnetic mounting means to a magnetic mounting plate.

* * * * *